Patented Jan. 22, 1929.

1,700,033

UNITED STATES PATENT OFFICE.

HARVEY RANDOLPH DURBIN, OF LARCHMONT, NEW YORK, ASSIGNOR TO INTERNATIONAL CEMENT CORPORATION, OF NEW YORK, N. Y., A CORPORATION OF MAINE.

PRODUCTION OF PORTLAND CEMENT.

No Drawing. Original application filed June 12, 1926, Serial No. 115,691. Divided and this application filed January 22, 1927. Serial No. 162,929.

This invention relates to the manufacture of Portland cement and it has for its object the production of improved Portland cement containing a silica, alumina and any of the usual impurities such as iron or magnesia, in which the silica, alumina and iron content are more completely saturated with lime than has hitherto been considered possible. The resulting cement obtained in accordance with this invention possesses remarkable early strength.

This application is a division of my application #115,691, filed June 12, 1926.

It is generally considered that the principal components of Portland cement are tricalcium aluminate ($3CaO.Al_2O_3$), tricalcium silicate ($3CaO.SiO_2$) and beta dicalcium silicate ($2CaO.SiO_2$). The minor components usually comprise magnesium oxide ($MgO$) and tricalcium ferrite ($3CaO.Fe_2O_3$), whilst gypsum ($CaSO_4.2H_2O$) is often present as an added constituent, and small quantities of carbon dioxide, alkalies, silica and water may occur.

The components possessing cementing qualities are the tri- and di- calcium silicates, although it is very probable that tricalcium aluminate and tricalcium ferrite possess cementing qualities to a small degree at any rate. Tricalcium silicate alone displays all the desirable characteristics of true Portland cement. Its hydrations proceed in an orderly manner and the addition of a retarder to control its reactions is usually unnecessary.

Dicalcium silicate, on the other hand, hydrates slowly and develops but little strength until after the lapse of several weeks.

The presence, therefore, of lower silicates of calcium tends to detract from the cementing qualities of the resulting Portland cement, and similarly it is desirable for the aluminates and ferrites to be in the highest form.

The ratio of combined silica ($SiO_2$) to combined lime ($CaO$) in the cement is known as the lime-silica index or factor. In the case of a cement comprising tricalcium silicate only the lime-silica index is 2.8. This is the highest form theoretically attainable but heretofore it has been impossible to produce a volume constant cement having a lime silica index of this value. Owing to the hitherto inevitable presence of the lower calcium silicates the index value has been less than 2.8 and consequently the resulting cement of less value than that desired. The presence of free lime is, of course, detrimental, and in considering the quality of a cement with reference to the lime-silica index only the thoroughness with which the lime-silica combinations have been perfected are taken into account.

Portland cement is the product obtained by finely pulverizing clinker produced by calcining to incipient fusion, an intimate and properly proportioned mixture of argillaceous and calcareous materials, and throughout the specification the expression "normal Portland cement clinker" is defined according to the above definition, taking into consideration the fact that heretofore normal Portland cement clinker comprises lower forms of lime-silica, lime-alumina and lime-ferrite.

Whilst the above discussion has endeavored to show theoretical reasons for the lack of consistency and slow hardening properties of present day Portland cement, it must not be assumed that the invention is limited on that account to the improvement of Portland cement in order to attain what appeared to be desirable results from theoretical considerations which at present are considered to be in order. It may be that the theoretical discussion of Portland cement as at present accepted is false, and in view of this the present invention must not be limited to within present day construction put upon the actions and reactions which take place in the production of high grade Portland cement.

In accordance with the above theoretical considerations the object of the present invention is to produce a cement which comprises the highest forms of lime-silica, lime-aluminum and lime-ferrite, and this invention is based upon the observation that if in the manufacture of normal Portland cement clinker, more than the usual amount of calcium carbonate or calcium hydrate, or calcium oxide, or a mixture of two or more of these compounds, is incorporated and burnt to a clinker, permitted to cool and the resulting clinker subjected to a further burning operation, the resulting product is a cement of exceptionally high strength and is, moreover, volume constant.

The improved Portland cement may therefore be produced by initially admixing more than the normal amount of carbonate of lime or the like with the usual parent constituents employed in the manufacture of cement, and after burning to the usual Portland cement clinker to permit the same to cool, grind, and then reheat without the addition of more carbonate of lime or the like being strictly necessary in order to obtain a complete saturation of the silica, alumina and ferrite compounds. It is therefore apparent that the present invention may be applied to the production of a high grade Portland cement clinker in such cases where a batch of normal cement has been inadvertently produced and contains an apparent excess of lime so as to render the batch of little or no use. It is obvious that this batch may be retreated in accordance with the present invention so as to result in a high grade cement. This latter application of the present process will be readily appreciated as constituting a valuable eliminator of waste, and as a means of reducing the possibility of spoilt batches to a minimum. Alternatively the process according to the present invention may be slightly modified so that while more than the normal amount of lime or the like is initially incorporated, after the first incipient fusion, more lime or the like is added and the whole subjected to the second heating operation. It must, of course, be understood that an excess of lime in the final product is detrimental and therefore the present invention is limited to the presence of only sufficient lime to produce the highest grade of cement.

It is impossible to produce such a volume-constant cement by a single burning operation, and the fusion of cement rocks and the like prior to the addition of lime does not effect the desired result. The amount of lime or the like to be added to the usual cement clinker constituents may be computed by analysis of normal clinker and subsequent estimation of the requisite quantity of lime needed to produce the highest forms of silicate, aluminate and ferrite.

The initial cement clinker formed by the first fusion is advantageously ground to a sufficient fineness so as to ensure intimate contact with the added lime or the like if this latter addition is necessary. The lime may be admixed with the clinker in a dry pulverized state or may be sprayed in any suitable manner as milk of lime or chalk paste.

The burning operation is carried out in the manner usually employed for the burning of normal Portland cement clinker. The clinker resulting from the process according to the present invention is ground into cement and is found to be of exceptionally high tensile strength. If necessary, the burning operation with additional lime or the like may be repeated until the desired product is obtained.

The resulting product is a high testing volume constant Portland cement clinker, and it has been found in practice that the tensile strength in pounds per square inch is in excess of 300 pounds after a twenty-four hours' test with a one to three sand mixture. It is obvious that this is considerably higher than the usual tensile strength exhibited with known cements, these latter only attaining a tensile strength of about 300 pounds per square inch after standing seven days.

It must be understod that the term "lime" employed throughout the claims includes all compounds which produce lime on heating.

Claims.

1. A process for the production of high grade cement which consists in incorporating silica, alumina and iron with lime in substantially the theoretical amounts necessary to fully saturate silica, alumina and iron therewith, burning the mass thus obtained to incipient fusion, permitting the resultant product to cool, grinding said product, re-burning the ground product to incipient fusion, permitting the re-burned product to cool, and grinding the same to cement.

2. A process for the production of high grade cement which consists in incorporating considerably more lime than will combine with silica, alumina and iron in one burning operation, but not more than substantially the theoretical quantity of lime necessary to fully saturate the silica, alumina and iron therewith, burning the mass to incipient fusion, grinding the resultant product, re-burning the ground product to incipient fusion, permitting the re-burned product to cool, and grinding the same to cement.

3. A process for the production of high grade cement which consists in incorporating considerably more lime than will combine with silica, alumina and iron in one burning operation, burning the mass to incipient fusion, grinding the resultant product, incorporating more lime therein, the total lime content being not more than substantially the theoretical quantity of lime necessary to fully saturate the silica, alumina and iron therewith, re-burning the ground product to incipient fusion, permitting the re-burned product to cool, and grinding the same to cement.

4. An improved Portland cement having a tensile strength in excess of 300 pounds per square inch at twenty-four hours in a one to three sand mix and which is prepared by incorporating silica, alumina and iron, with lime in amounts not more than that necessary to theoretically saturate the silica, alumina and iron therewith, but considerably more lime than will combine with silica, alumina and iron in one burning operation, burning the mass to incipient fusion, grinding the resultant product, re-burning the ground product to incipient fusion, and grinding the re-burned product to cement.

In testimony whereof I affix my signature.

HARVEY RANDOLPH DURBIN.